(12) United States Patent
Giachetti (10) Patent No.: US 10,190,832 B2
(45) Date of Patent: *Jan. 29, 2019

(54) INTEGRATED PRESSURE COMPENSATING HEAT EXCHANGER AND METHOD

(71) Applicant: Nuovo Pignone Tecnologie Srl, Florence (IT)

(72) Inventor: Silvio Giachetti, Florence (IT)

(73) Assignee: Nuovo Pignone Tecnologie Srl, Florence (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,037

(22) Filed: Nov. 22, 2017

(65) Prior Publication Data
US 2018/0094880 A1     Apr. 5, 2018

Related U.S. Application Data

(63) Continuation-in-part of application No. 13/593,916, filed on Aug. 24, 2012, now Pat. No. 9,863,723.

(30) Foreign Application Priority Data

Aug. 25, 2011 (IT) .............. CO2011000033

(51) Int. Cl.
| | |
|---|---|
| *F28F 19/00* | (2006.01) |
| *F28D 7/08* | (2006.01) |
| *F28F 1/08* | (2006.01) |
| *H02K 5/20* | (2006.01) |
| *F28F 9/02* | (2006.01) |

(Continued)

(52) U.S. Cl.
CPC .............. *F28F 19/00* (2013.01); *F28D 7/08* (2013.01); *F28F 1/08* (2013.01); *F28F 9/0236* (2013.01); *H02K 5/20* (2013.01); *H02K 9/10* (2013.01); *H02K 9/19* (2013.01); *F28F 2265/12* (2013.01);
(Continued)

(58) Field of Classification Search
CPC .. F28F 9/013; F28F 9/26; F28F 9/0236; F28F 2265/14; F28F 2265/12; F28F 2265/26; F28F 19/00; F28F 1/08; F28D 7/08; H02K 5/20; H02K 9/19; H02K 9/10
USPC ....... 417/472; 401/152, 153; 165/51, 81–83, 165/282, 286; 138/106
See application file for complete search history.

(56) References Cited

U.S. PATENT DOCUMENTS 3,526,934 A * 9/1970 Owen, Sr. ............ F16B 7/0433
                                                              138/106
3,650,192 A * 3/1972 Kellner ................ G03B 17/045
                                                              355/55

(Continued)

FOREIGN PATENT DOCUMENTS

GB         2451862 A *  2/2009 .............. F28D 7/06

*Primary Examiner* — Devon Kramer
*Assistant Examiner* — Christopher Brunjes
(74) *Attorney, Agent, or Firm* — GE Global Patent Operation (57) ABSTRACT

An integrated pressure compensating heat exchanger and method of use are provided. The integrated pressure compensating heat exchanger includes an inlet configured to input an internal fluid; a first conductive bellows connected to the inlet, configured to accept the internal fluid from the inlet, configured to transfer heat between the internal fluid and an external fluid, and configured to compensate for a pressure by compressing in length; and an outlet configured to accept the internal fluid from the first conductive bellows and to output the internal fluid.

8 Claims, 9 Drawing Sheets

(51) Int. Cl.
*H02K 9/19* (2006.01)
*H02K 9/10* (2006.01)

(52) U.S. Cl.
CPC ....... *F28F 2265/14* (2013.01); *F28F 2265/26* (2013.01)

(56) References Cited

U.S. PATENT DOCUMENTS

| | | | | |
|---|---|---|---|---|
| 4,328,860 | A * | 5/1982 | Hoffmuller | F28F 9/013 165/81 |
| 6,485,029 | B1 * | 11/2002 | Moody | E06B 7/18 277/642 |
| 9,863,723 | B2 * | 1/2018 | Giachetti | F28F 9/0236 |
| 2009/0026061 | A1 * | 1/2009 | Gsell | B01D 1/289 202/175 |
| 2010/0021284 | A1 * | 1/2010 | Watson | B60L 7/10 415/123 |

\* cited by examiner

INTEGRATED PRESSURE COMPENSATING HEAT EXCHANGER AND METHOD

CROSS-REFERENCE TO RELATED APPLICATIONS/INCORPORATION BY REFERENCE

This application is a Continuation of U.S. patent application Ser. No. 13/593,916 filed Aug. 24, 2012 which claims priority to Italian Patent Application No. CO2011000033 filed Aug. 25, 2011, the disclosure of these prior applications are hereby incorporated by reference in their entirety.

BACKGROUND OF THE INVENTION

Embodiments of the subject matter disclosed herein generally relate to methods and devices and, more particularly, to integrated pressure compensating heat exchangers and methods for using same in electric engines connected to compressors.

During the past years, the importance of large electric engines in various industries has increased. For example, large electric engines are used to drive turbo-machinery used in power generation, cryogenic applications, oil and gas refining, petrochemistry, etc. Specifically, a large electric engine may be connected to a compressor.

These electric engines produce a great deal of heat internally due to electrical resistance in the windings. Typically these electric engines are cooled (and also electrically insulated) by a fluid such as oil which gets hot by absorbing heat from the windings. Then the hot oil itself is cooled by another fluid (such as ambient air) in a heat exchanger.

One problem is that the oil expands as its temperature increases, and a pressure compensator is required to compensate for the increased volume of the oil. Oil is a relatively incompressible fluid, and increases in temperature in a fixed volume (such as in a cavity inside of a sealed electric motor) and will cause tremendous increases in pressure which may blow out a seal or even catastrophically explode the electric motor. Therefore, a pressure compensator is essential, in addition to the heat exchanger. The pressure compensator may use a bellows or a piston to compensate for changes in volume of the oil in order to maintain a safe pressure. Thus, the electric engine requires a heat exchanger, and also requires a pressure compensator.

A second problem is that the heat exchanger and pressure compensator are conventionally distinct and separate devices (in other words, these devices are not integrated). Distinct devices require more parts, and more parts increase the cost and decrease the reliability.

A third problem is that the pressure compensator is conventionally located outside of the electric motor. This external location requires at least one additional opening or passage in the electric motor to route the oil to and from the pressure compensator. Furthermore, this external location requires some external mounting mechanism for the pressure compensator, exposes the pressure compensator to the risk of mechanical damage from external physical events, and exposes the pressure compensator to external chemical attack (such as corrosion from salt water). Also, the external location exposes the pressure compensator to external temperature fluctuations.

Additional problems caused by conventional designs include: requiring a large heat exchanger; requiring very precise temperature and pressure control; requiring many additional parts due to not being integrated; being overly sensitive to ambient temperature fluctuations; requiring complex plant couplings; and not allowing standardization.

Figure 1:
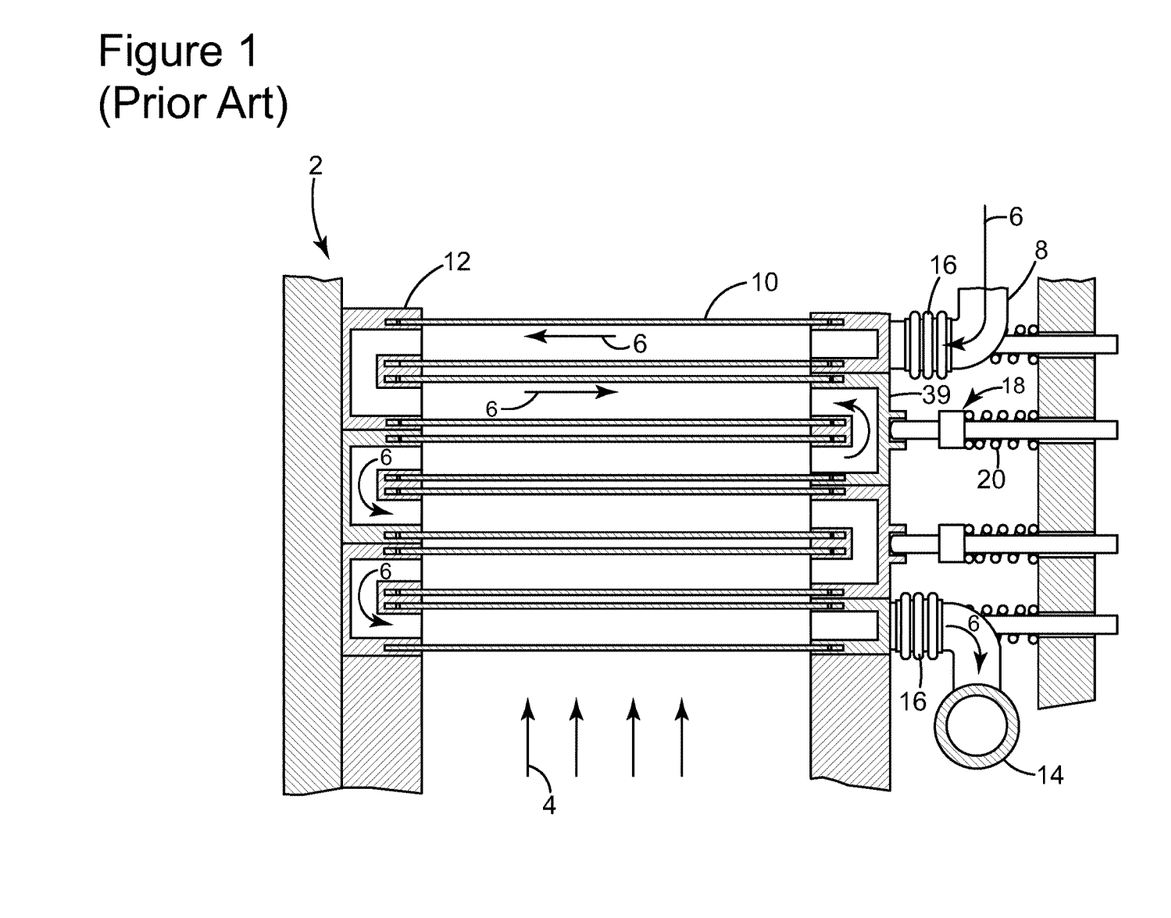
FIG. 1 is a schematic diagram of a conventional heat exchanger.

FIG. 1 is a conventional heat exchanger assembly 2 including non-conductive bellows 16. Specifically, an external fluid 4 passes over tubes 10, and exchanges heat with an internal fluid 6 through the walls of tubes 10. The internal fluid 6 enters inlet elbow 8, passes through an inlet non-conductive bellows 16, passes through a series of tubes 10 and U-shaped adaptors 39, passes through an outlet non-conductive bellows 16, and finally exits through an outlet elbow 14. The term "non-conductive bellows" indicates that the non-conductive bellows is not located in a flow path of the external fluid, and therefore is not configured to conduct heat between the external fluid and the internal fluid.

Additionally, a spring mechanism 18 includes a spring 20 which maintains spring pressure against a U-shaped adaptor 39. This spring pressure keeps the U-shaped adaptor 39 squeezed against the tubes 10 in order to maintain a seal between the U-shaped adaptor 39 and the tubes 10, and thereby working as an expansion joint. In FIG. 1, it appears that the non-conductive bellows 16 are primarily used to accommodate the physical movement of the U-shaped adaptors 39 in response to the horizontal thermal expansion of the tubes 10.

FIG. 1 (described above) is derived from the first figure of Hoffmüller (U.S. Pat. No. 4,328,680, the entire content of which is incorporated herein by reference). Note that Hoffmüller uses the term "expansion pressure device" in the Abstract regarding accommodating the axial (longitudinal) thermal expansion of the heat exchanger tubes, and does not address compensating fluid pressure caused by volumetric increases of heat transfer fluids due to temperature increases.

Neary et al. (U.S. Pat. No. 3,527,291, the entire content of which is incorporated herein by reference) discloses an expansion joint 22 including a non-conductive bellows 23 located directly between (and passing internal fluid between) a heater tube 18 and a header pipe 12 at FIG. 3 of Neary. The explicit purpose of the non-conductive bellows 23 in Neary is for "preventing tube buckling by accommodating tube expansion," as stated at column 1, lines 24-45 of Neary.

Byrne (U.S. Pat. No. 4,246,959, the entire content of which is incorporated herein by reference) discloses a flexible metal non-conductive bellows 32 in FIG. 2 of Byrne. The explicit purpose of the non-conductive bellows 32 in Byrne is to "allow thermal growth or movement of the heat exchanger in three dimensions" as stated at column 2, lines 59-60 of Byrne.

Koiji (English Abstract of JP 58160798, the entire content of which is incorporated herein by reference) discloses a sliding piston ring 5 which absorbs the "difference of longitudinal thermal expansions of the inner wall surface of the hole 2 and the circular pipe 4," as stated in the English Abstract of Koiji.

Oda (U.S. Pat. No. 4,753,457, the entire content of which is incorporated herein by reference) discloses a non-conductive bellows 40 connecting a flange member 53 to a metallic ring 30 in FIG. 1. This configuration permits that "the heat insulating layer 60 can follow the tube 10 within the range of movement permissible to the [non-conductive] bellows 40, and the gastight sealing properties can be maintained," as discussed at column 6, lines 63-65 of Oda. Note that the heat insulating layer 60 of Oda intentionally blocks heat exchange through the non-conductive bellows 40.

Modine (European Patent Application EP 1878990 A1, the entire content of which is incorporated herein by reference) discloses an elastic sleeve 15 connecting a tube 11 to a header 18. This elastic sleeve 15 is configured to "allow each tube in a heat exchanger to expand freely and independently of the other tubes," as stated at column 1, lines 27-28.

All of the above references (Hoffmüller, Neary, Byrne, Koiji, Oda, and Modine) are conventional heat exchangers which use non-conductive bellows merely to accommodate the physical movements of heat exchanger tubes due to thermal expansion of the tubes (primarily expansion or lengthening along the axial direction of the tubes). Again, the term "non-conductive bellows" indicates that the non-conductive bellows is not located in a flow path of the external fluid, and therefore is not configured to exchange heat between the external fluid and the internal fluid.

These references do not disclose using bellows to pressure compensate the thermal expansion of an incompressible heat transfer fluid (such as oil), and certainly do not disclose an integrated pressure compensating heat exchanger. Further, these references do not disclose using conductive bellows for heat exchange, and do not disclose integrating pressure compensation and heat exchange in a single part.

Accordingly, it would be desirable to provide devices and methods that overcome the above described problems and drawbacks.

BRIEF DESCRIPTION OF THE INVENTION

According to an embodiment of the present invention, an integrated pressure compensating heat exchanger including an inlet, a conductive bellows, and an outlet is provided. The conductive bellows is configured to exchange heat between an external fluid located outside of the conductive bellows and an internal fluid passing internally through the conductive bellows. Additionally, the conductive bellows is configured to compensate for a change in the pressure of at least one of the fluids by compressing (contracting) in length to change a volume of the conductive bellows.

According to another embodiment of the present invention, an integrated pressure compensating heat exchanger including an inlet, a first conductive bellows, a first adaptor, a second conductive bellows, a second adaptor, an outlet, a first guide, a second guide, a preload spring, and an actuator is provided. The inlet, the first conductive bellows, the first adaptor, the second conductive bellows, the second adaptor, and the outlet are configured so that an internal fluid flows sequentially through them. The first conductive bellows, the second conductive bellows, and a smooth portion of the outlet are substantially parallel, and are held substantially parallel by the guides. The actuator is configured to move the first adaptor in a direction parallel to the first and second conductive bellows such that the first and second conductive bellows are compressed, and such that the second guide slides along the smooth portion of the outlet while maintaining the parallel configuration of the first and second conductive bellows and while compressing the preload spring.

Throughout this specification and claims, the direction of flow of the internal fluid is arbitrary, and may be reversed at any time. In other words, the inlet may serve as an outlet, and an outlet may serve as an inlet.

According another embodiment of the present invention, an integrated pressure compensating heat exchanger including an inlet, a first conductive bellows, an adaptor, a second conductive bellows, an outlet, and a guide plate is provided. An axial direction of the first conductive bellows and an axial direction of the second conductive bellows are parallel to each other. The guide plate is configured such that a direction normal to the surface of the guide plate is substantially perpendicular to the axial (longitudinal) directions of the first conductive bellows and of the second conductive bellows. The guide plate is located adjacent to the first conductive bellows and the second conductive bellows, such that the first conductive bellows and the second conductive bellows are prevented from passing through the surface of the guide plate during compression of the first conductive bellows and the second conductive bellows. Furthermore, the guide plate has orifices configured to facilitate a flow of an external fluid through the guide plate. If three or more conductive bellows are used, and if the axes of the three or more conductive bellows are parallel to each other and are not in the same plane, then the guide plate may be curved to accommodate (conform with) the non-planar orientation of the three or more conductive bellows.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE EXEMPLARY EMBODIMENTS OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Throughout these specification and claims, the direction of flow of the internal fluid is arbitrary, and may be reversed at any time. In other words, the inlet may serve as an outlet, and an outlet may serve as an inlet.

Throughout these specification and claims, the term "conductive bellows" indicates that the conductive bellows are configured to exchange heat between an internal fluid passing inside the conductive bellows and an external fluid passing outside the conductive bellows.

Throughout this specification and claims, sequential orders of parts are often listed. These sequential orders allow insertion of other parts between the listed parts.

Figure 2A:
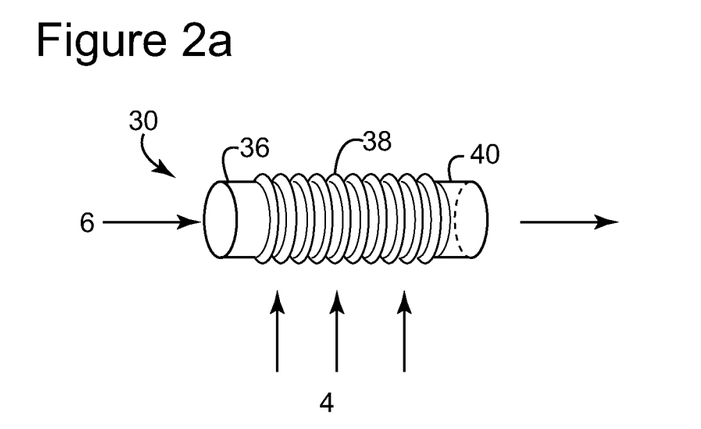
FIG. 2a is a schematic diagram of an integrated pressure compensating heat exchanger with conductive bellows (in an uncompressed configuration)

FIG. 2a is a schematic diagram of an integrated pressure compensating heat exchanger (IPCHE) with conductive bellows (in an uncompressed configuration).

In FIG. 2a, an integrated pressure compensating heat exchanger (IPCHE) with conductive bellows is shown in an uncompressed configuration 30, and includes: an inlet 36, a conductive bellows 38 (uncompressed), and an outlet 40. An internal fluid 6 passes internally through the conductive bellows 38 from left to right. An external fluid 4 passes externally over the conductive bellows 38 and exchanges heat with the internal fluid 6 through the walls of the conductive bellows 38. The fluids may flow by natural convection or may be pumped (forced convection).

Figure 2B:
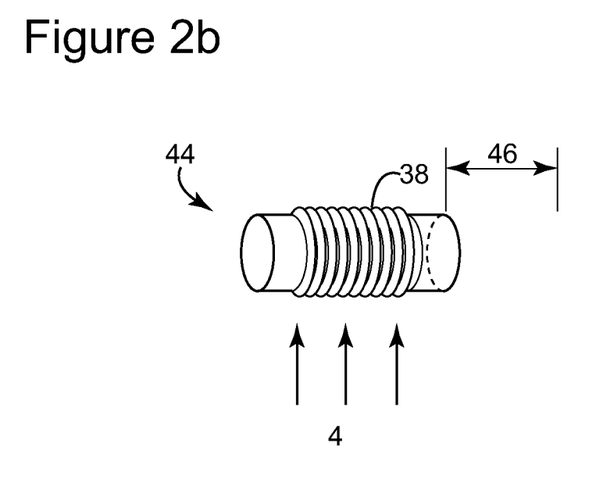
FIG. 2b is a schematic diagram of an integrated pressure compensating heat exchanger with conductive bellows (in a compressed configuration)

FIG. 2b illustrates an integrated pressure compensating heat exchanger (IPCHE) with conductive bellows shown in a compressed configuration 44. In the compressed configuration, the conductive bellows 38 is compressed in an axial (longitudinal) direction resulting in a change in length 46. This compression results in a change of volume of the conductive bellows 38. The change in bellows volume for a single bellows is approximately equal to the cross sectional area of the conductive bellows 38 times the change in length 46 (volume=area times length) for an approximately cylindrical bellows which compresses in an axial direction. Also, FIG. 2b clearly illustrates a decrease in volume of the conductive bellows as the configuration changes from uncompressed (FIG. 2a) to compressed (FIG. 2b).

The decrease in volume of the conductive bellows ("bellows volume") may accommodate (pressure compensate) for: a) an increase in volume of the internal fluid due to expansion from heating, or b) a decrease in volume of the internal fluid due to contraction from cooling. Conversely, an increase in bellows volume may accommodate conditions opposite to those described above. The exact shape and deformation characteristics of the conductive bellows may be considered for precise calculations.

In one embodiment, the external fluid is oil in a cavity of fixed volume in the body of an electric motor, the internal fluid is a process gas (i.e., a gas that is being compressed by a compressor attached to the electric motor), and an increase in temperature of the oil results in an increase of the volume of the oil. This increase in the volume of the oil is pressure compensated (or "absorbed") by the decrease in the volume (compression) of the conductive bellows. In other words, the expanding oil expands into some volume previously occupied by the conductive bellows. In another application, the external fluid is the process gas and the internal fluid is oil. Of course, those skilled in the art would appreciate that the external and internal fluids may be various other substances.

As an illustrative calculation, an electric motor may have 600 liters of oil (V), may experience temperatures ranging from 0 to 120 degrees Celsius ($\Delta T=120$), and may have a diathermic fluid thermal expansion coefficient of 0.000765 per degree Celsius (k). The change in volume ($\Delta V$) of the oil is calculated as follows: $\Delta V(oil)=V \times \Delta T \times k$. Inserting the above values yields a change in volume $\Delta V(oil)$ of 55 liters.

Further, a bellows may have an effective diameter (D) of 82 mm, a total length (L) of 470 mm, and a compression change in length ($\Delta L$) of 67% of the total length ($\Delta L=315$ mm). The cross sectional area (A) of the bellows is calculated as $A=(\pi \times D2)/4$ which equals 5278 mm2. The change in volume of a single bellows is calculated as $\Delta V$(single bellows)$=A \times \Delta L$, which equals 1,662,667 mm3. A liter equals 1,000 cubic centimeters, or equals 1,000,000 mm3. Converting, $\Delta V$(single bellows)=1.66 liters. Therefore, the number of bellows (N) needed to compensate for the expansion of the oil is calculated as $N=\Delta V(oil)/\Delta V$(single bellows) which equals about 33 bellows.

If design constraints limit the number of bellows to a maximum of 24 bellows, then these 24 bellows can only compensate for a $\Delta V(oil)$ of 40 liters (which is less than the 50 liters discussed above). In this case, one or more other factors may be varied to satisfy this 24 bellows constraint. For example: the diameter and/or length of the bellows may be increased; a small dedicated pressure compensator may be added (preferably internally, inside the oil cavity); the casing of the electric motor may be redesigned to decrease the volume of oil required; a different oil may be used which is less sensitive to changes in temperature (smaller k); and so forth. The final engineering design is a complex multivariable optimization problem, and beyond the scope of this discussion.

Additional advantages of the conductive bellows of FIG. 2 include: compact due to integration of pressure compensating and heat exchanging functions; excellent heat exchange characteristics due to large surface area of bellows (in comparison to conventional tubes); can optionally incorporate active pressure control (discussed below); and easy to install due to flexibility of bellows.

Figure 3A:
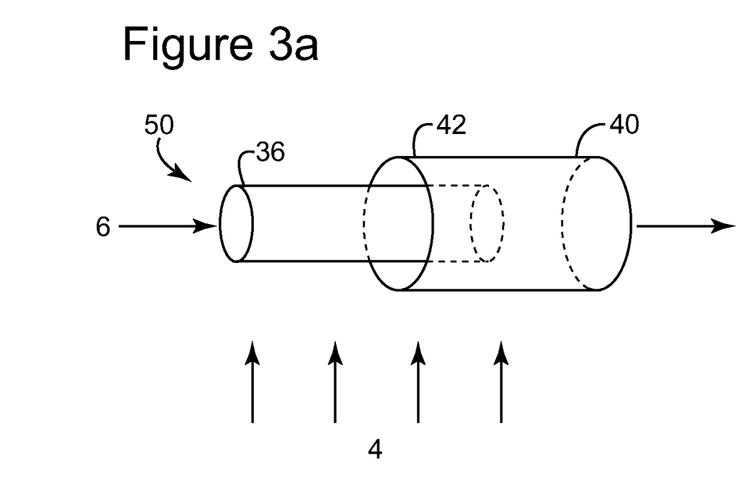
FIG. 3a is a schematic diagram of an integrated pressure compensating heat exchanger with a piston (in an uncompressed configuration)

FIG. 3a is a schematic diagram of an integrated pressure compensating heat exchanger (IPCHE) with a conductive piston. FIG. 3a is similar to FIG. 2a discussed above, except that a conductive piston 42 is used instead of a conductive bellows 38 to illustrate an uncompressed (expanded) configuration.

Figure 3B:
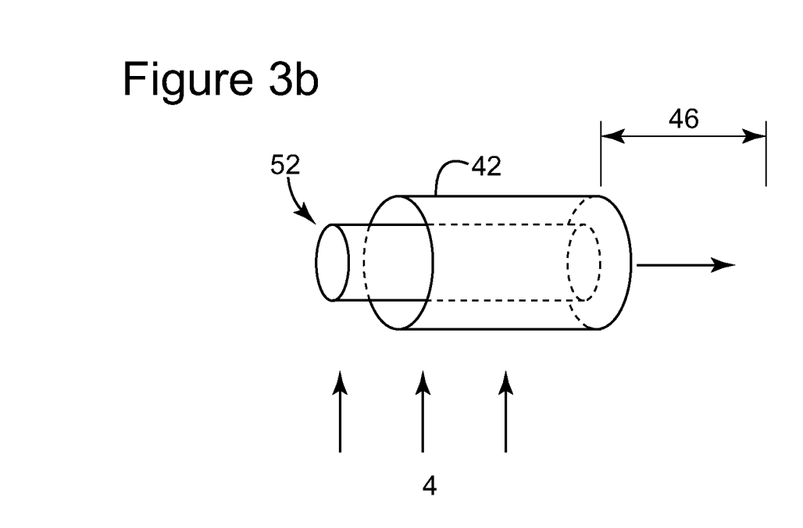
FIG. 3b is a schematic diagram of an integrated pressure compensating heat exchanger with a piston (in a compressed configuration)

FIG. 3b is similar to FIG. 2b discussed above, except that a conductive piston 42 is used instead of a conductive bellows 38 to illustrate a compressed (unexpanded) configuration.

Figure 4A:
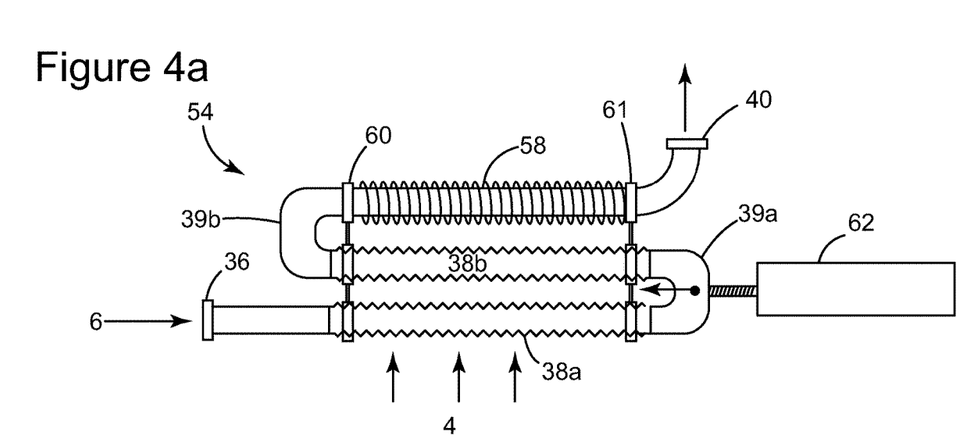
FIG. 4a is a schematic diagram of an integrated pressure compensating heat exchanger with guides, a spring, and an actuator (in an uncompressed configuration)

FIG. 4a is a schematic diagram of an integrated pressure compensating heat exchanger (IPCHE) with guides, a spring, and an actuator in an uncompressed configuration. Specifically, FIG. 4a illustrates an integrated pressure compensating heat exchanger with actuator in an uncompressed configuration 54 includes an inlet 36 admitting an internal fluid 6. The internal fluid 6 passes sequentially through: the inlet 36, a first conductive bellows 38a, a first U-shaped adaptor 39a, a second conductive bellows 38b, a second U-shaped adaptor 39b, and an outlet 40. The outlet 40 includes a smooth portion substantially parallel with the first and second conductive bellows 38a and 38b.

A first guide 60 and a second guide 61 are configured to link the first and second bellows to the smooth portion of outlet 40. A preload spring 58 is compressively preloaded to push the first guide 60 and the second guide 61 apart so that the first and second conductive bellows are in an uncompressed configuration. The actuator 62 is connected to the first U-shaped adaptor 39*a*.

Figure 4B:
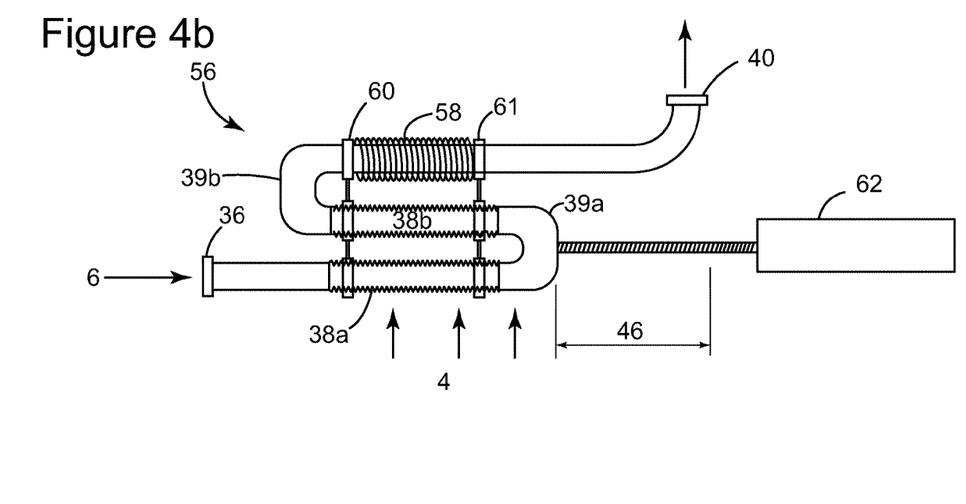
FIG. 4b is a schematic diagram of an integrated pressure compensating heat exchanger with guides, a spring, and an actuator (in a compressed configuration)

FIG. 4*b* illustrates an integrated pressure compensating heat exchanger with actuator (in a compressed configuration) 56. The actuator 62 has pushed the first U-shaped adaptor 39*a* to the left, thereby compressing the first and second conductive bellows. The guide ring 61 slid to the left along the smooth portion of the outlet 40, while holding and stabilizing the first and second conductive bellows as they are compressed simultaneously. The actuator 62 may be replaced by or combined with a position sensor (not shown). The actuator 62 may actively control a pressure of a fluid, or a pressure differential between the internal fluid and the external fluid.

FIG. 4*b* illustrates several novel advantages. First, using two conductive bellows 38*a* and 38*b* joined by a first U-shaped adaptor 39*a* allows compression to occur without changing the locations of the inlet 36 and the outlet 40. Further, this compression may be controlled by the first U-shaped adaptor 39*a*, which is connected to a single actuator 62. This first U-shaped adaptor 39*a* may be described as "mobile," whereas the second U-shaped adaptor 39*b* may be described as "stationary." In this fashion, a single mobile U-shaped adaptor 39*a* effectively controls two bellows 38*a* and 38*b* (which may be described as "paired").

Second, additional bellows may be added (preferably in pairs) while retaining this very useful feature of allowing compression without changing the location of the inlet 36 and the outlet 40. See FIG. 5 which adds 4 more bellows (adds 2 more pairs of bellows).

Third, the preload spring 58 tends to push the first U-shaped adaptor 39*a* to the right, and thus tends to push the actuator 62 into the uncompressed position (when the actuator is not actuated), as shown in 54. Therefore, the actuator 62 may be a "single action" actuator which only exerts a force (leftward in this example) when actuated, and the preload spring exerts a force (rightward) at all times.

Alternatively, a "double action" actuator may be used to directly push or pull the first U-shaped adaptor 39*a* to the left or to the right in order to respectively compress or decompress the integrated pressure compensating heat exchanger (which would eliminate the need for the preload spring).

Figure 5:
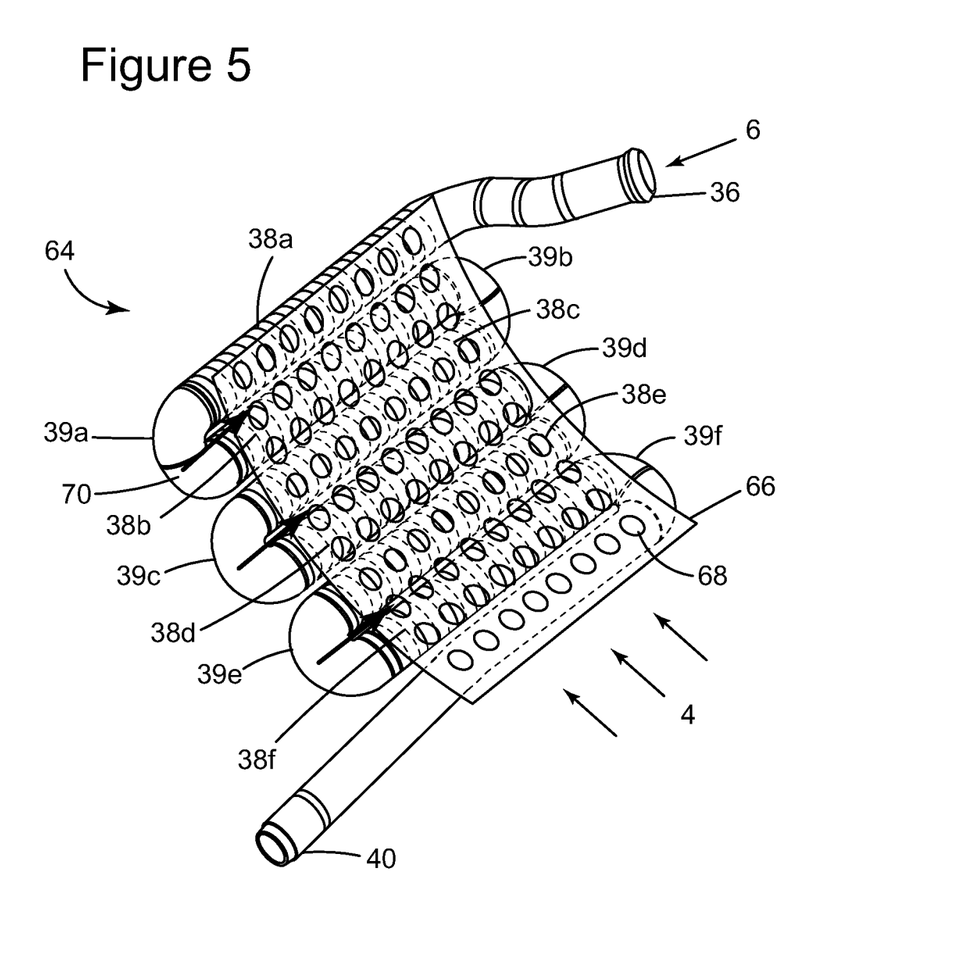
FIG. 5 is a schematic diagram of an integrated pressure compensating heat exchanger with a guide plate (shown in an uncompressed configuration)

FIG. 5 is a schematic diagram of an integrated pressure compensating heat exchanger (IPCHE) with a guide plate (shown in an uncompressed configuration) 64. See FIG. 7 for an illustration of compressed bellows adjacent to a guide plate.

In FIG. 5, the internal fluid 6 enters an inlet 36, and then passes sequentially through: a first conductive bellows 38*a*, a first U-shaped adaptor 39*a*, a second conductive bellows 38*b*, a second U-shaped adaptor 39*b*, a third conductive bellows 38*c*, a third U-shaped adaptor 39*c*, a fourth conductive bellows 38*d*, a fourth U-shaped adaptor 39*d*, a fifth conductive bellows 38*e*, a fifth U-shaped adaptor 39*e*, a sixth conductive bellows 38*f*, a sixth U-shaped adaptor 39*f*, and an outlet 40 having a long smooth portion parallel and adjacent to the sixth conductive bellows 38.

Arrow 70 indicates a direction of compression. The first, third, and fifth U-shaped adaptors (39*a* and 39*c* and 39*e* located at the left side of FIG. 5) move in the direction of arrow 70 during compression of the bellows 38. These three U-shaped adaptors 39*a* and 39*c* and 39*e* may be described as "mobile," because they move during compression (and may be attached to one or more actuators, not shown). These three U-shaped adaptors 39*a* and 39*c* and 39*e* may be connected to a single actuator (not shown), and/or may be held by a guide (not shown) preferably coupled to the smooth portion of outlet 40. The smooth portion of outlet 40 also provides a convenient mounting location for one edge of guide plate 66 (mounts not shown). In FIG. 5, the bellows are uncompressed. See FIG. 7 for an illustration of compressed bellows adjacent to a guide plate.

The sixth U-shaped adaptor 39*f* is attached to outlet 40, and therefore is stable or fixed in position. The second and fourth U-shaped adaptors 39*b* and *d* are preferably fixed in position (not shown), but may be mobile.

Alternatively, the sixth U-shaped adaptor 39*f* may be omitted, and then the outlet 40 would connect directly (not shown) to the sixth conductive bellows, and would point upwards and to the right, instead of downwards and to the left. A guide plate 66 keeps the bellows 39 in a specific orientation. As shown, guide plate 66 has the curved shape of a portion of the surface of a cylinder, wherein the cylinder has an axial direction parallel with the axial directions of the conductive bellows 38.

The guide plate 66 serves several functions. The interior of the cylinder may contain moving parts (not shown) which may puncture the U-shaped adaptors 39 or the conductive bellows 38. Thus, it is important to allow the conductive bellows 38 to contract in the direction of the arrow 70 while being restrained from entering the cylinder defined by the guide plate 66. Further, the inlet 36 and the outlet 40 may be fixed to the guide plate 66.

Additionally, the guide plate 66 may have orifices 68 allowing the external fluid 4 to easily pass through and then to transfer heat to the internal fluid 6 through the bellows 38. The guide plate 66 may have other shapes (for example, planar instead of cylindrical), and the orifices 68 may be rectangular (for example, orifices resulting from a matrix of wires such as a screen). The guide plate 66 may have no orifices 68, or may have orifices 68 only in certain areas in order to direct the flow of external fluid into a desired flow pattern. The guide plate 66 may also have protrusions (not shown) preventing the first conductive bellows 38 from touching (scraping against) the second conductive bellows 38. The guide plate 66 may be bent to create troughs (not shown) being coaxial with and individually guiding each conductive bellows 38.

Figure 6:
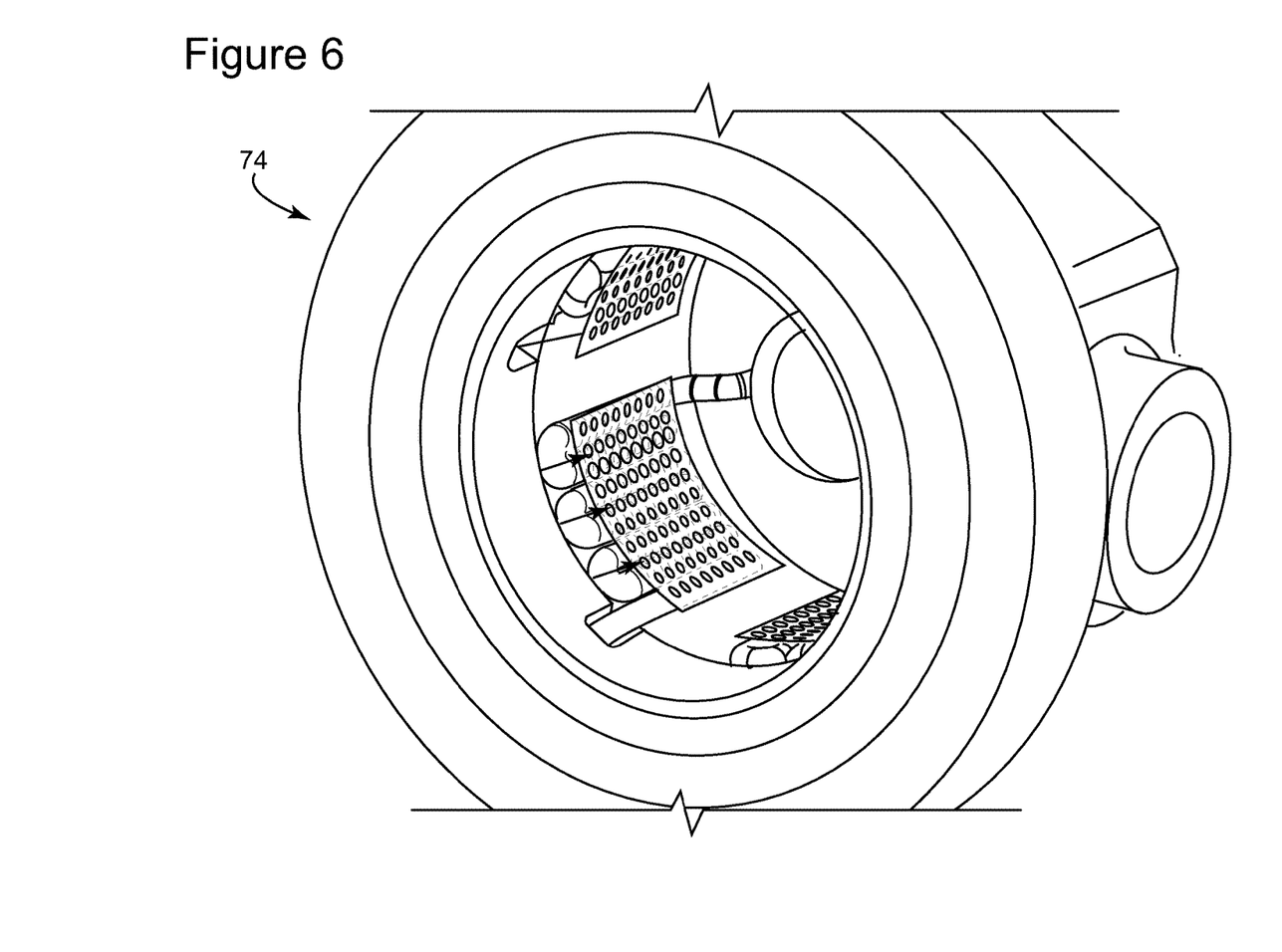
FIG. 6 is a schematic diagram of an integrated pressure compensating heat exchanger assembly with a guide plate (in an uncompressed configuration)

FIG. 6 is a schematic diagram of an integrated pressure compensating heat exchanger assembly with a guide plate (in an uncompressed configuration) 74. Specifically, FIG. 6 is similar to FIG. 5, except that the integrated pressure compensating heat exchanger is shown situated in the casing of an electric motor. The interior surface of the casing defines the exterior surface of a cavity holding an external fluid such as oil.

Figure 7:
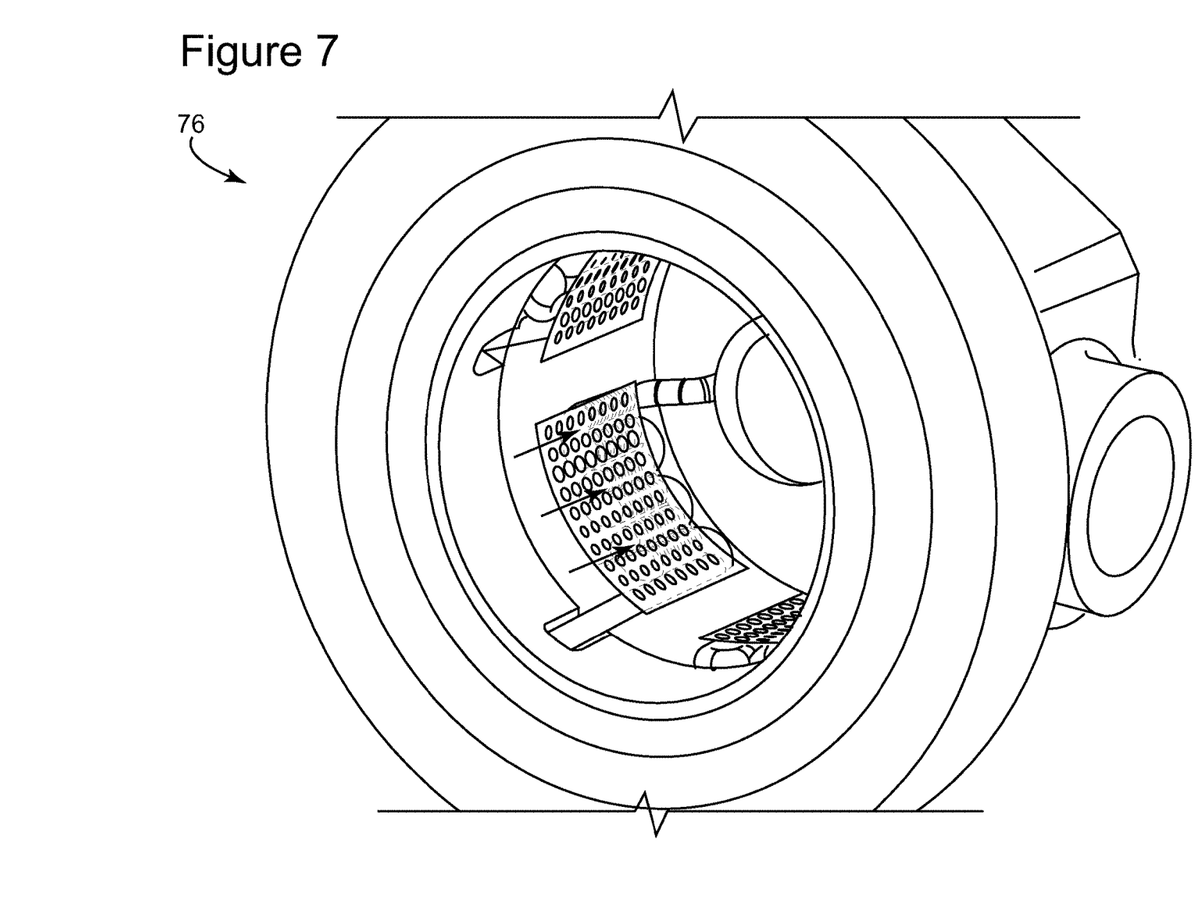
FIG. 7 is a schematic diagram of an integrated pressure compensating heat exchanger assembly with a guide plate (in a compressed configuration)

FIG. 7 is a schematic diagram of an integrated pressure compensating heat exchanger assembly with a guide plate (in a compressed configuration) 76. FIG. 7 is similar to FIG. 6, except that the bellows 38 are compressed. This compression was previously illustrated in the lower portions of FIGS. 2, 3, and 4.

Figure 8:
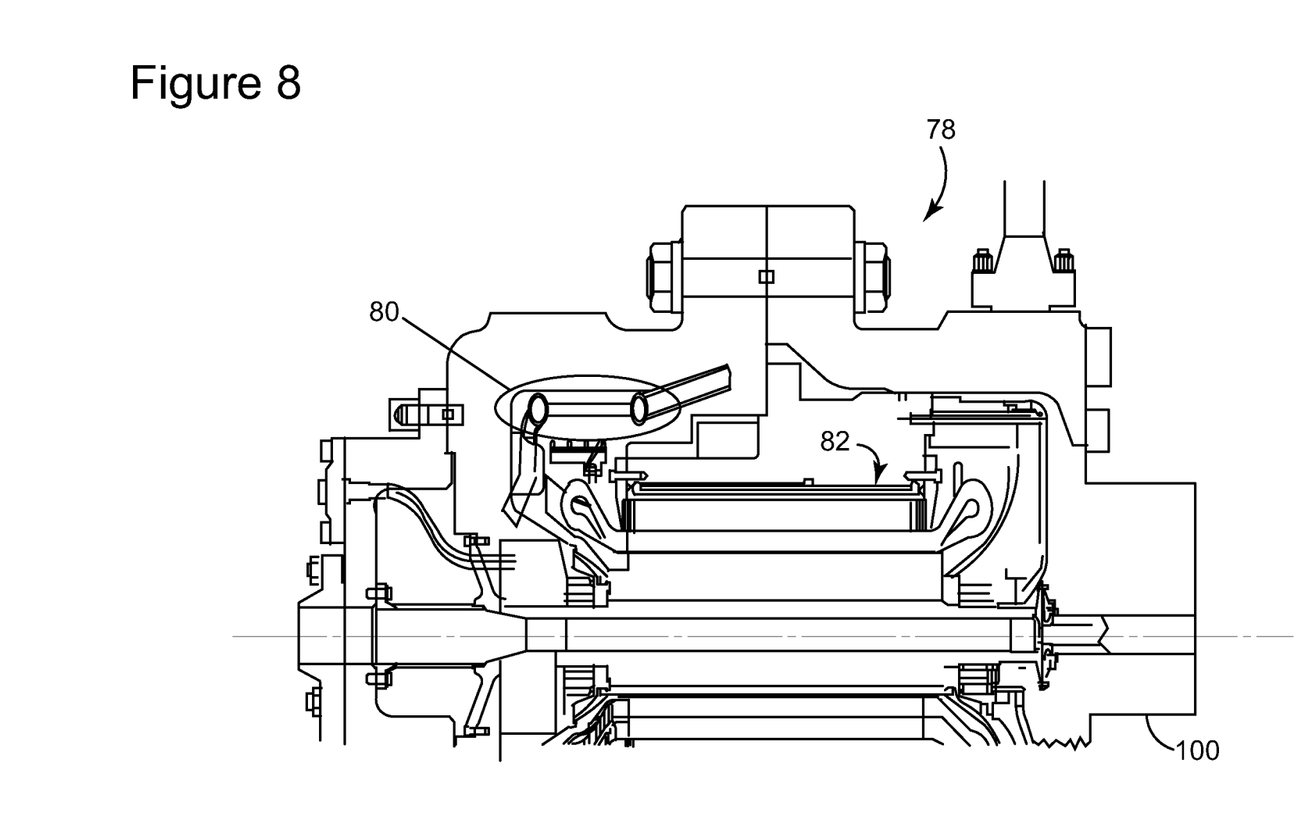
FIG. 8 is a schematic diagram of an electric engine including an integrated pressure compensating heat exchanger.

FIG. 8 is a schematic diagram of an electric engine assembly 78 including an electric engine 82 and an integrated pressure compensating heat exchanger 30. The electric engine 82 may be a permanent magnet motor. Ellipse 80 shows the location of the integrated pressure compensating heat exchanger 30 inside of an electric engine. FIG. 8 also shows part of a compressor 100 that may be integrated with the electric engine 82.

Figure 9:
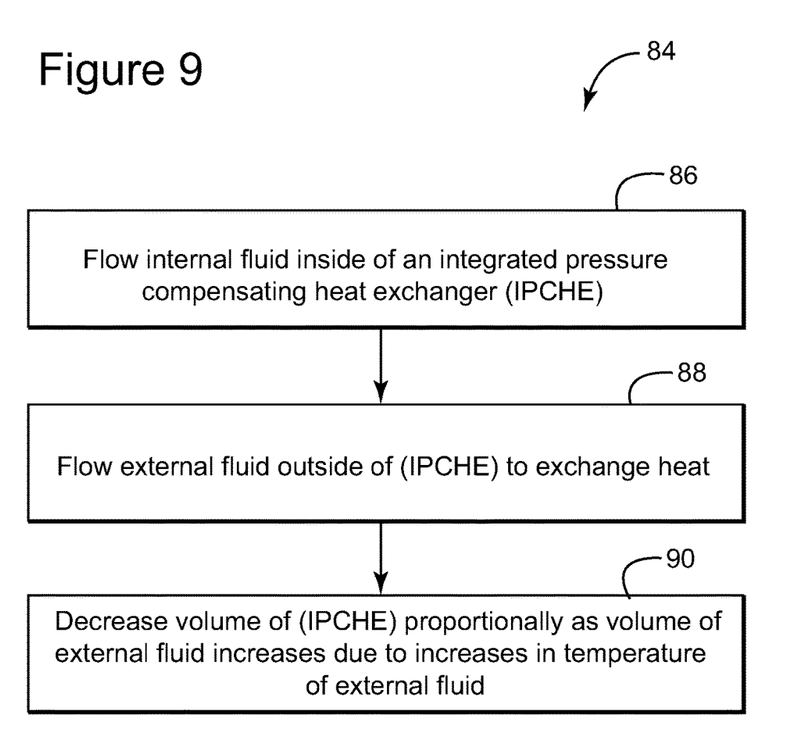
FIG. 9 is a flow chart illustrating a method of using an integrated pressure compensating heat exchanger.

FIG. 9 is a flow chart 84 illustrating a method of using an integrated pressure compensating heat exchanger 30.

First step 86 flows an internal fluid 6 inside of the integrated pressure compensating heat exchanger 30. Second step 88 flows an external fluid 4 outside of the integrated pressure compensating heat exchanger 30 to exchange heat with the internal fluid 6. Third step 90 decreases a volume of integrated pressure compensating heat exchanger 30 proportionally as a volume of the external fluid 4 increases due to increases in temperature of the external fluid 4, such that the integrated pressure compensating heat exchanger 30 compresses to a compressed configuration 44.

The decrease in volume of integrated pressure compensating heat exchanger 30 may occur automatically as a pressure of the external fluid increases and presses harder, or may occur in response to an actuator 62.

Similarly, the volume of the integrated pressure compensating heat exchanger 30 may increase as a volume of the internal fluid 4 increases.

It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for compensating for pressure and for cooling an external fluid with an integrated pressure compensating heat exchanger, the method comprising:

flowing an internal fluid inside of the integrated pressure compensating heat exchanger, the internal fluid flowing sequentially through an inlet, a first conductive bellows, a first U-shaped adaptor, a second conductive bellows, and an outlet, wherein the heat exchanger comprises the first conductive bellows and the second conductive bellows;

flowing the external fluid outside of the integrated pressure compensating heat exchanger;

decreasing a volume of the integrated pressure compensating heat exchanger into a compressed configuration as a volume of the external fluid increases due to a temperature increase in the external fluid;

sliding a second guide along a smooth portion of the outlet as the first conductive bellows and the second conductive bellows compress simultaneously, the second guide mechanically coupling the smooth portion of the outlet to the first conductive bellows and to the second conductive bellows; and actively controlling a pressure differential between an internal fluid and an external fluid using an active actuator by pushing and pulling the first conductive bellows and the second conductive bellows, wherein the active actuator is mechanically coupled to the first U-shaped adaptor communicatively located between the first conductive bellows and the second conductive bellows.

2. The method of claim 1 further comprising a second U-shaped adaptor communicatively located between the second conductive bellows and the outlet, wherein the second U-shaped adaptor is stationary.

3. The method of claim 1, wherein the actuator is combined with a position sensor.

4. The method of claim 1, wherein the first conductive bellows and the second conductive bellows are configured to receive the internal fluid from the inlet, to transfer heat between the internal fluid and the external fluid, and to compensate for a pressure by compressing in length.

5. The method of claim 1, further comprising a first guide mechanically coupling the smooth portion of the outlet to the first conductive bellows and to the second conductive bellows.

6. The method of claim 1, wherein the first conductive bellows is connected to the inlet.

7. The method of claim 1, wherein the first U-shaped adaptor is mobile.

8. The method of claim 1, wherein the second conductive bellows is communicatively located between the first U-shaped adaptor and the outlet.

\* \* \* \* \*